United States Patent [19]
Johnson

[11] 4,253,725
[45] Mar. 3, 1981

[54] SINGLE SIDEBAND SCANNER

[75] Inventor: Richard V. Johnson, Pasadena, Calif.

[73] Assignee: Xerox Corporation, Stamford, Conn.

[21] Appl. No.: 27,342

[22] Filed: Apr. 5, 1979

[51] Int. Cl.³ ............................................. G02B 27/17
[52] U.S. Cl. ..................... 350/6.91; 358/199
[58] Field of Search ........... 350/6.8, 6.91, 6.1; 346/109, 108, 1; 355/45, 60; 358/199, 127

[56] References Cited
U.S. PATENT DOCUMENTS

| | | | |
|---|---|---|---|
| 3,597,536 | 8/1971 | Fawler | 350/6.91 |
| 3,631,248 | 12/1971 | Johnson | 350/6.91 |
| 3,719,780 | 3/1973 | Gazard et al. | 350/6.91 |
| 3,798,365 | 3/1974 | Browing et al. | 346/1 |
| 4,000,493 | 12/1976 | Spaulding et al. | 346/1 |
| 4,106,845 | 8/1978 | Moore et al. | 350/6.8 |

OTHER PUBLICATIONS

The Compatibility Problem in Single Sideboard Transmission, K. H. Powers, I.R.E., Aug. 1960, pp. 1431-1436.

*Primary Examiner*—John K. Corbin
*Assistant Examiner*—B. W. de los Reyes
*Attorney, Agent, or Firm*—Leonard Zalman

[57] ABSTRACT

A scanner using spatial modulation of the light profile incident upon an acousto-optic modulator in which the deflector clear aperture window is decentered from the optical axis of the system so that the light profile falls just within one edge of the deflector clear aperture window. One advantage of the decentering of the optical alignment is increased system frequency response due to transmission of only one sideband of the light profile, which in terms of a printing systems means increased resolution. Loss of laser light due to decentering of the optical alignment can be minimized by using a single sideband signal as the modulator drive signal instead of the conventional double sideband drive signal. Distortion of the light profile due to decentering of the optical alignment can be reduced by predistorting the single sideband drive signal supplied to the acousto-optic modulator.

5 Claims, 10 Drawing Figures

SINGLE SIDEBAND SCANNER

BACKGROUND OF THE INVENTION

The conventional flying spot optical scanner consists generally of a light source, an optical modulator, focusing optics, an optical deflector and a photosensitive surface. The optical modulator, which can be of the acousto-optic type, converts the electronic video data signal supplied to the modulator into a corresponding temporal modulation of the power of the optical beam incident on the modulator. Stated differently, the modulator simply blanks the power of the optical beam on and off. Flying spot optical scanners do not utilize any change in the spatial intensity profile of the light beam. If a light beam having a Gaussian light beam profile enters the modulator, then a Gaussian profile is expected to emerge, albeit possibly subdued in total power, in response to the video signal.

After temporal modulation, the light beam is then hard focussed to a pinpoint and swept across the photosensitive surface by the scanning optics and the optical deflector. For best results, the scanner optics hard focus the modulated light beam to provide a spot size which is infinitesimally small and possessed of rapid risetime.

It has been realized that an optical modulator of the acousto-optic type exhibits a spatial modulation capability. In other words, if a light beam having a Gaussian profile enters an acousto-optic modulator, the modulator truncates this Gaussian profile in a time-varying sequence in response to the video signal. The Scophony scanner, described by D. M. Robinson in Proc. IRE 27,483 (1939), uses an acousto-optic modulator to provide such spatial truncation. The Scophony scanner provides an ability to increase the light beam diameter inside the acousto-optic modulator without suffering resolution degradation. This ability to accommodate larger beam diameters has distinct performance advantages over the flying spot scanner configuration.

A distinctive feature of the Scophony scanner is a broadening of the light profile (the light profile incident on the deflector when the video signal is a pure DC bias with no modulation) observed at the deflector with the introduction of video modulation of the acousto-optic modulator. This broadening is called FM blur. For example, a pure sinusoidal video signal will split the light profile into two video lobes, one corresponding to the positive video frequency component and one corresponding to the negative frequency component. The separation between the centers of these video lobes is directly proportional to the video frequency. The higher the video frequency, the greater will be the broadening of the light distribution. As the video modulation frequency increases, the side-lobes separate until they spill over the boundary of the clear aperture of the deflector. When spillover occurs, the resolution performance of the Scophony scanner degrades. This underscores a fundamental difference between the Scophony scanner and the convential flying spot scanner. In the conventional flying spot scanner no spatial information is intended to be transmitted. If fine spatial structure exists in the scan spot, then the optical system could produce a still smaller scan spot with better resolution. In contrast, the Scophony system exploits the transmission of spatial modulation information to attain peak resolution. Spatial information can be transmitted through the system only when the deflector window (the active reflective surface) is underfilled with the light beam profile. If the deflector window were overfilled, then FM blur could only pull light energy out of the window (by broadening the sidelobes) without introducing any significant spatial modulation inside the window. Spatial information would be lost. On the other hand, if the light profile filled only a fraction of the deflector window, then an appreciable amount of FM blur could be generated without loss of either information or light power. Thus, a direct correlation exists in the Scophony scanner between the spatial extent of the light in the deflector window and the resolution performance.

SUMMARY OF THE INVENTION

In accordance with the invention, a light profile of increased frequency is passed by the deflector of a Scophony scanner system by decentering the optical alignment of the system so that the light profile falls just within one edge of the deflector window. That is, the optical system of the Scophony scanner is adjusted so that only one of the video lobes or sidebands of the light profile is incident upon and passed by the deflector window. One advantage of this decentering of the optical alignment is an increased frequency response by the system due to transmission of only one sideband of the light profile, which in terms of a printing system, means increased resolution. The loss of expensive laser light due to transmission of only a single sideband of the light profile can be minimized by using a single sideband signal as the modulator drive signal, and distortion of the light profile can be minimized by predistorting the single sideband drive signal applied to the acousto-optic modulator.

BRIEF DESCRIPTION OF THE DRAWINGS

Specific embodiments of the invention are described in detail below with reference to the drawings for those embodiments, in which.

DETAILED DESCRIPTION OF THE INVENTION

Figure 1:
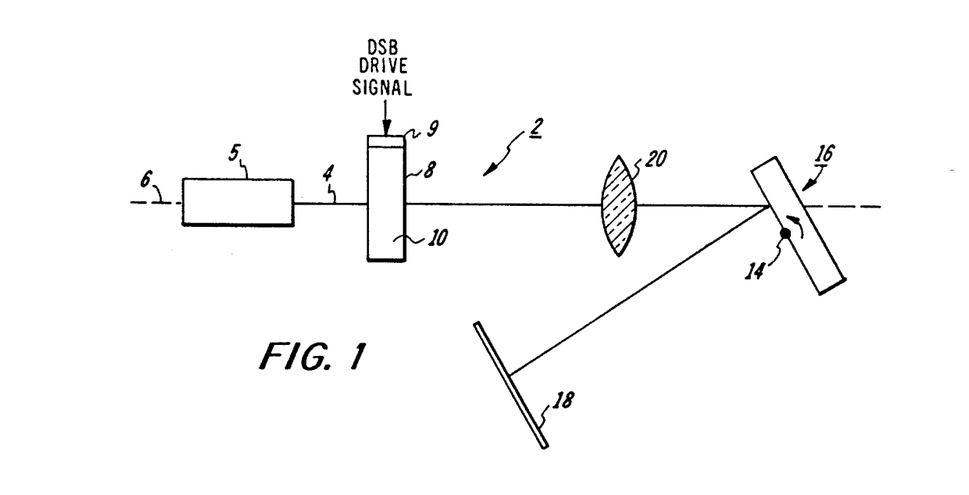
FIG. 1 is a schematic illustration of a Scophony scanner with a decentered deflector.
Figure 10:
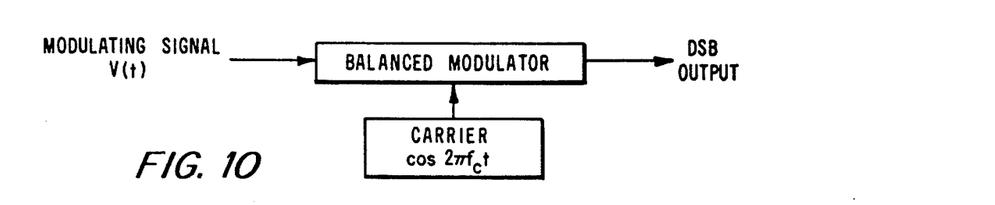
FIG. 10 is a schematic diagram of a conventional circuit for supplying a double sideband drive signal to the modulator of FIG. 1.

Referring first to FIG. 1, there is shown a Scophony scanner 2 in accordance with one aspect of the invention. A monochromatic coherent light beam 4 generated by a conventional laser 5 is projected along optical axis 6 and is incident upon a conventional acousto-optic modulator 8. Modulator 8 would usually comprise a prizoelectric transducer 9 bonded to an acousto-optic sound cell 10 of a high refractive index material, such as telluride glass. Transducer 9 is driven by a double sideband drive signal which can be produced by conventional double sideband drive electronics 11 such as shown in FIG. 10. The video drive signal causes acoustic pulses to move through the sound cell 10.

Flat mirror 14 of a conventional galvanometer 16 deflects the information modulated laser beam onto a photosensitive surface 18. Mirror 14 is controlled by an external signal which causes it to rotate about its axis to provide a line-scan function across surface 18. An imaging system, depicted as a single lens 20, is located between the modulator 8 and the photosensitive surface 18, with the modulator and photosensitive surface an image conjugates. The imaging system (lens 20) will have a magnification given by equation (1) below.

Three design requirements define the Scophony scanner configuration.

Scophony Requirement No. 1: The imaging system 20 must be placed between the modulator and the scan surface such that the modulator and the scan surface are optical conjugates of the imaging system.

In relation to FIG. 1, Requirement No. 1 can be satisfied by placing lens 21 midway between modulator 8 and photosensitive surface 18.

Another Scophony scanner requirement concerns the magnification of the imaging system.

Scophony Requirement No. 2: The scanner optics must constitute an imaging system with magnification M (along the scan direction) substantially equal to $$M = \frac{\text{scan spot speed}}{\text{speed of acoustic pulses in the modulator}} = v_{scan}/v_{sound} \quad (1)$$

This is necessary to ensure that the exposure profile which is imaged onto the photosensitive surface has the required spatial scaling.

In the absence of scanning, the acoustic pulse motion will cause the image which is projected onto the photosensitive surface to exhibit similar motion. (See FIG. 2.) If the acoustic pulses move with speed $v_{sound}$, then the pulse images will move with speed $M \cdot v_{sound}$ (in the absence of scanning), where M is the magnification of the imaging system 20. But this magnification has already been fixed at the ratio $(v_{scan}/v_{sound})$. Therefore, in the absence of scanning, the acoustic pulse images will stream across the photosensitive surface with speed $v_{scan}$. A significant characteristic of the Scophony scanner is that the scan speed is constant.

This pulse image motion, if uncompensated, will blur the exposure profile which is recorded on the photosensitive surface, rendering the scanner resolution completely unacceptable. This pulse image must be suppressed by scanning in a direction opposite to the pulse image motion (net speed = acoustic image speed + scan speed = —scan speed + scan speed = 0). This will be achieved only if the modulator is properly oriented within the scanner module.

Scophony Requirement No. 3: The modulator must be oriented such that the scanning motion precisely compensates the acoustic pulse image motion, rendering the image motionless.

Figure 2:
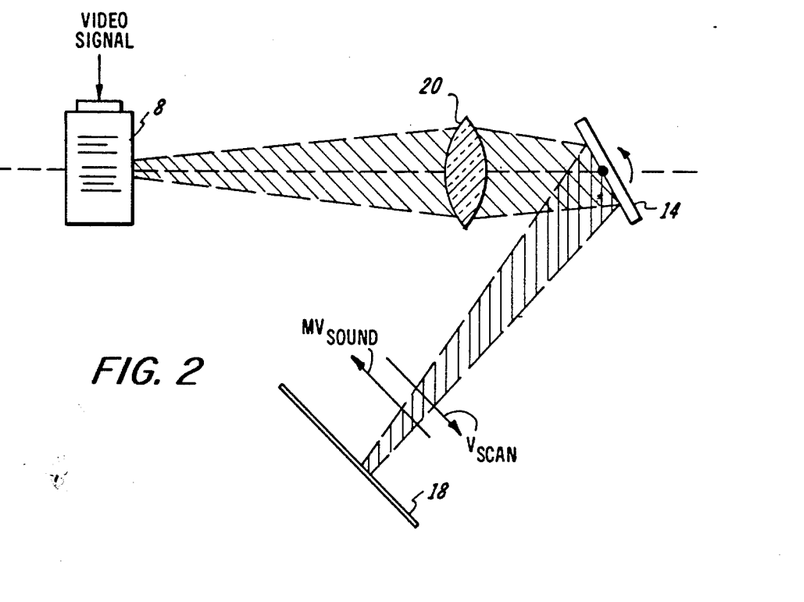
FIG. 2 is a schematic illustration of a Scophony scanner showing pulse immobilization.

Only one modulator orientation will satisfy this condition, that is, modulator 8 must be oriented such that the sound field propagates in the same plane as the plane in which the light beam propagates, that is, in the systems of FIGS. 1 and 2, the sound field must propagate in the plane of the drawing.

The advantage of adhering to the above design requirements is the ability to increase the light beam diameter inside the acousto-optic modulator without suffering resolution degradation. This ability to accommodate larger beam diameters has distinct performance advantages over flying spot scanners.

Figure 3:
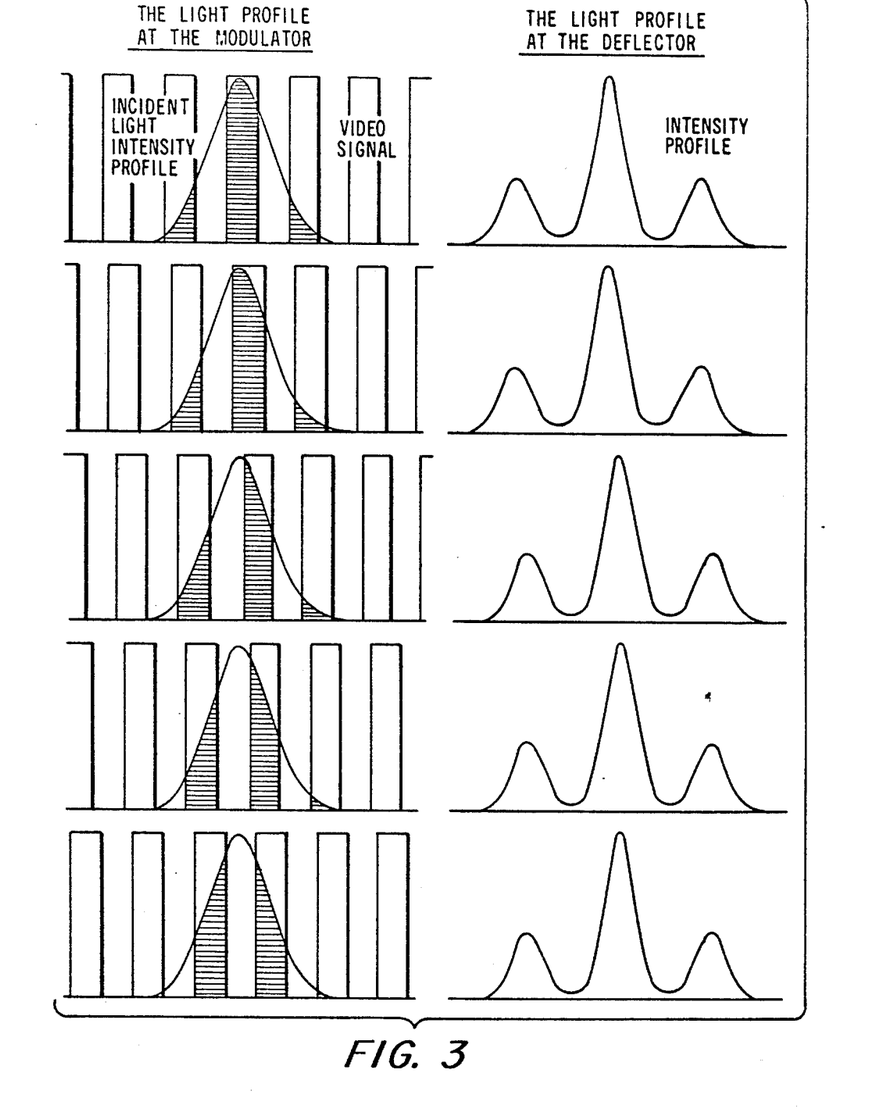
FIG. 3 shows the broadening of the light profile with video modulation.

The key concept to understand regarding a Scophony scanner is that the light profile incident on the deflector mirror is a reasonably faithful representation of the "instantaneous" frequency spectrum of the video signal. The light profile is the most compact distribution of light to be observed at the deflector mirror. The introduction of any video modulation to the modulator will necessarily broaden this distribution. For example, as shown in FIG. 3, a pulsed video signal of a given frequency will interact at the modulator with an incident Gaussian light intensity profile to produce at the deflector mirror a light profile having a positive video component and a negative video component. The separation of the centers of these profiles or components is directly proportional to the video frequency. The higher the video frequency, the greater will be the broadening of the light distribution. As the video frequency increases, the positive and negative light profile components separate, until they "spill over" the boundaries of the deflector mirror (indicated by the two vertical lines in FIG. 4). Since light profile information beyond the boundaries of the deflector mirror is lost when "spill over" occurs, the resolution performance of the Scophony scanner is degraded.

Figure 4:
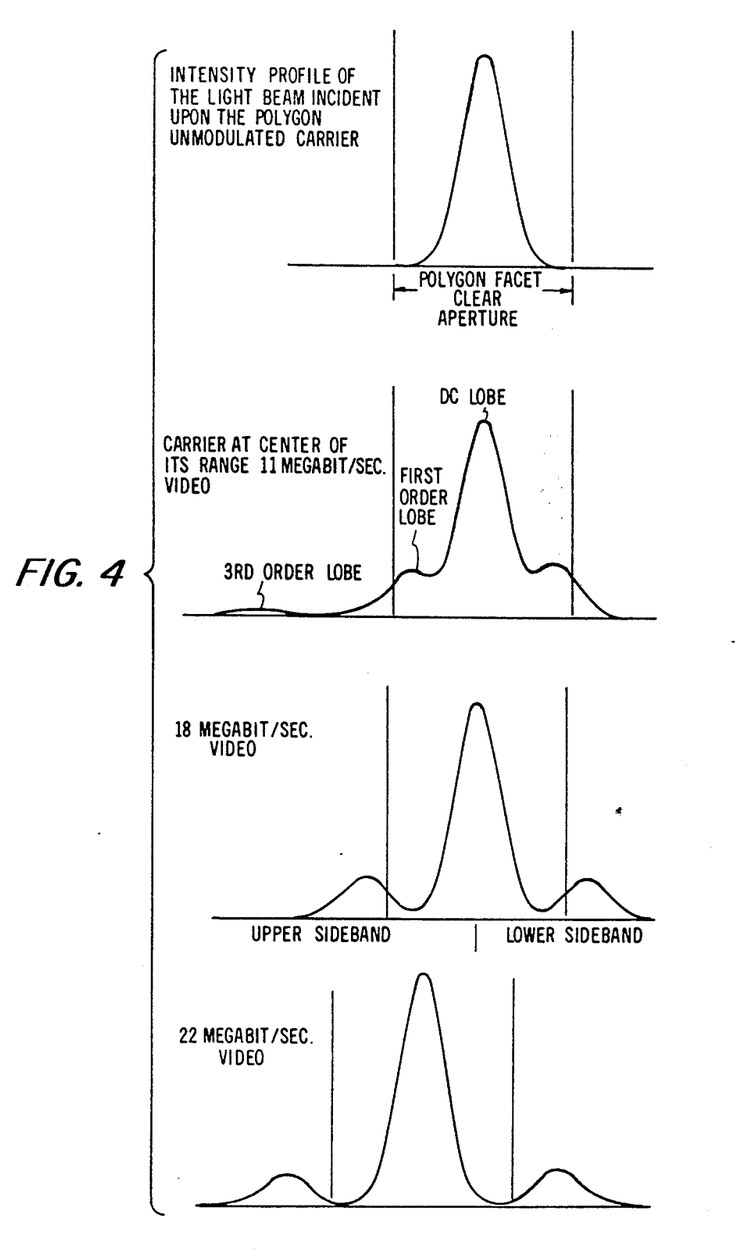
FIG. 4 shows a broadened light profile at the deflector window.

Referring further to FIGS. 3 and 4, it can be seen that the light profile at the deflector mirror consists of two sidebands—two mirror images of the video signal spectrum. The video information is contained in either sideband. The presence of both sidebands constitutes redundant coding of the video information.

The deflector mirror window acts as a bandpass filter, passing some frequencies while blocking others. Conventional optical alignment philosophy is to center the illumination profile upon the deflector window. When the light profile is centered upon the deflector window, the deflector will pass a band of ½ f of the positive frequency sideband and a band of ½ f of the negative frequency sideband, where $$f = \frac{A v_{sound}}{\lambda F}$$

and A = the clear aperture of the deflector, $V_{sound}$ = the speed of sound in the modulator, $\lambda$ = the wavelength of the incident light beam, and F = the focal length of the scan optics. However, the information content of the positive frequency spectrum and of the negative frequency spectrum is redundant, and so the bandpass characteristic of the deflector window is not optimally utilized.

In accordance with the invention, the deflector mirror is aligned relative to the optic axis 6 such that the optic axis 6 intersects the deflector mirror adjacent one edge of the deflector mirror 14, as shown in FIG. 1, instead of at the center of the deflector window as in a conventional Scophony scanner. That off-center alignment causes the center of the light profile to fall just within one edge of the deflector window. The deflector window will now pass only one sideband, but that sideband will contain twice as much non-redundant video information as provided by the conventional Scophony optical alignment.

Figure 5:
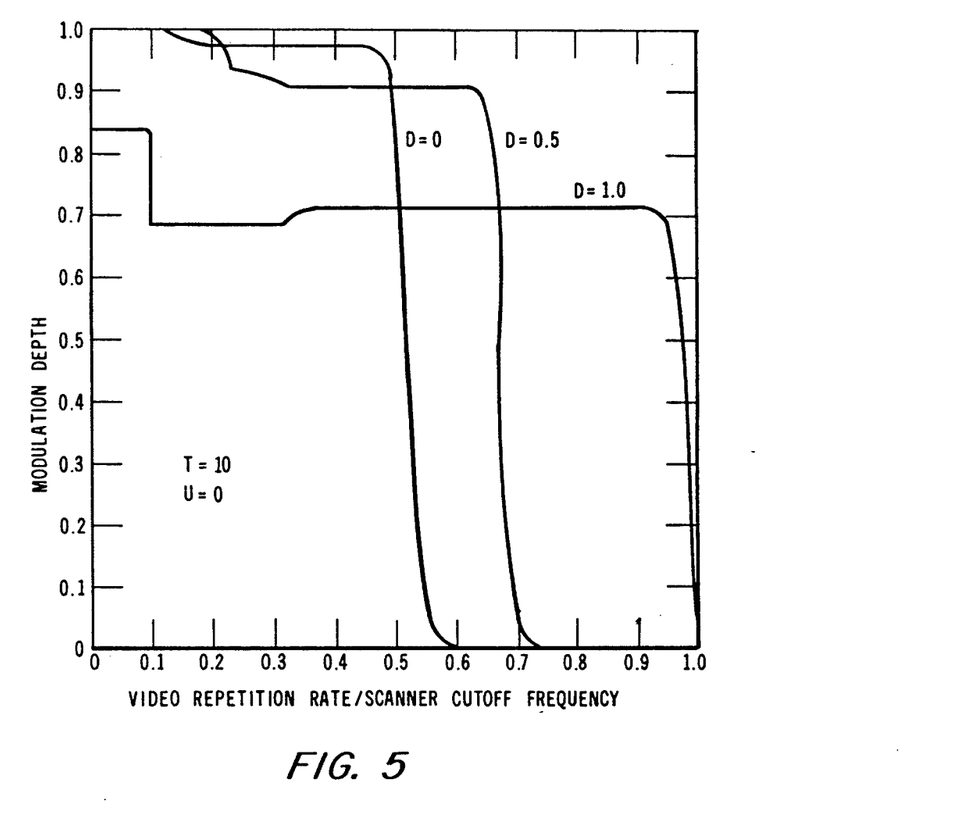
FIG. 5 shows the response of a Scophony scanner with a decentered deflector window to a square pulse video signal train.
Figure 6:
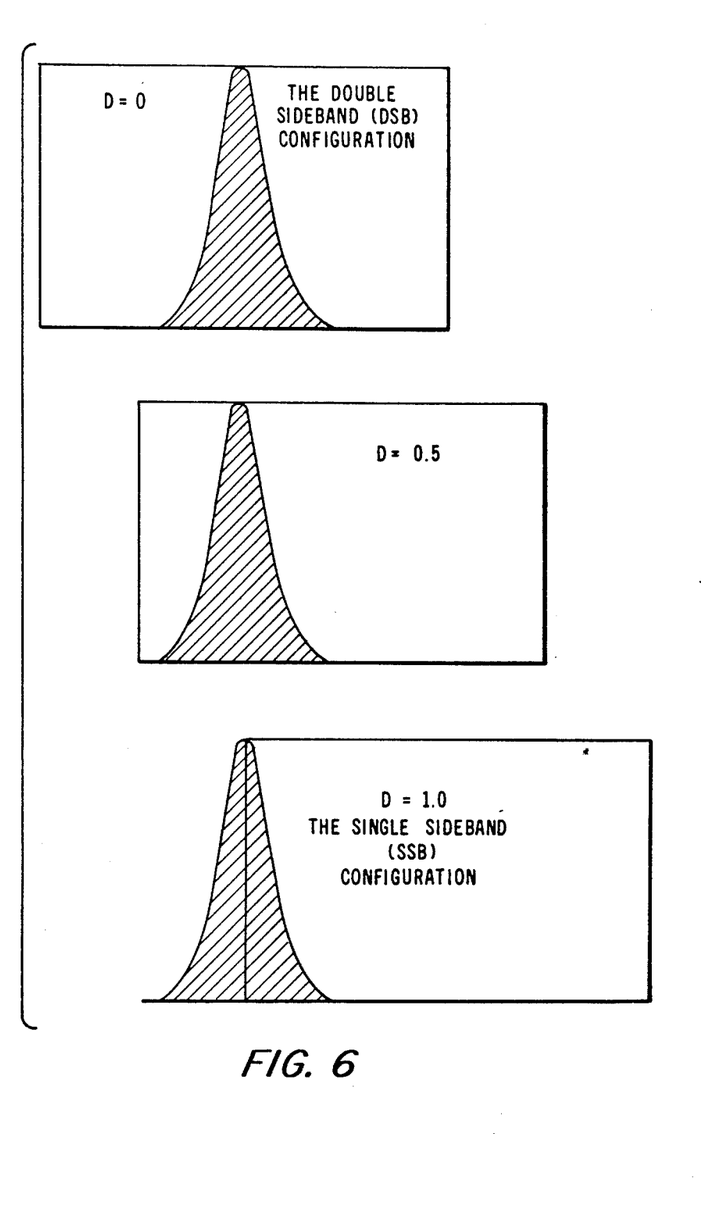
FIG. 6 defines a decentering parameter D.

The impact and advantages of decentering the optical alignment are shown by reference to FIGS. 5 and 6. A decenter parameter "D" is defined in FIG. 6. "D=0" corresponds to the conventional optical alignment wherein the center of the light profile is centered on the deflector window. "D=1" corresponds to an extreme version of the invention, in which the center of the light profile straddles an edge of the deflector window. This extreme orientation is not preferred because it induces a 50 percent loss in optical throughput efficiency half of the light incident upon the deflector falls outside the deflector window. A preferred design would be to have the center of the light profile somewhere between D=0 and D=1, such as D=0.5 as illustrated. FIG. 5 shows the response of a decenter deflector window to a square video train for different values of the decentering parameter D.

Figure 7:
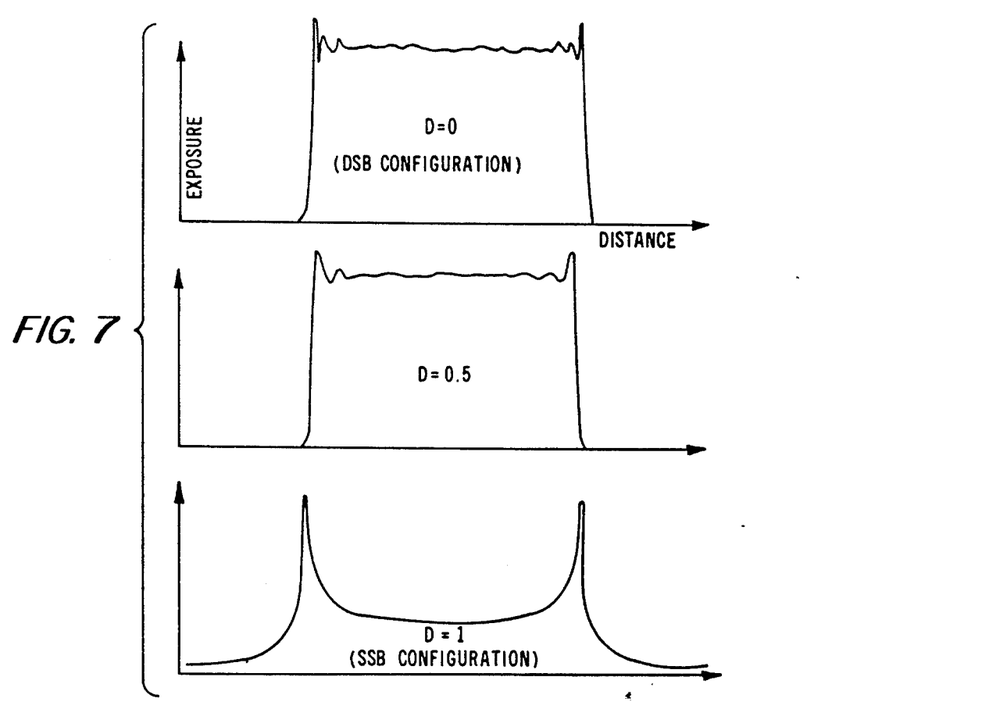
FIG. 7 shows typical light profile distortion with a decentered deflector window.

The decentering of the optical alignment pursuant to the invention has the advantage of extending the frequency response of the scanner by as much as a factor of two compared with the conventional Scophony scanner. However, in addition, in the absence of compensating predistortion of the video drive signal as discussed hereinafter, the decentering has the following disadvantages:

(1) The light captured by the deflector window degrades by 20 to 50 percent.
(2) The video suffers distortion as shown in FIG. 7. A square pulse developes sharp spikes at the pulse edges, with extremely slow edge decay.
(3) The DC bias of the video signal is unbalanced when the optical alignment is decentered, degrading the exposure contrast ratio.

Within the context of a printer in which a photoconductive drum or belt is exposed, the primary benefit of the disclosed decentered Scophony scanner is a doubling of the resolution capability of the scanner (along the scan direction) with no more investment than a slight realignment to the optical system. The primary problem is an increased loss of expensive laser light and distortion of the light exposure profile.

Figure 8:
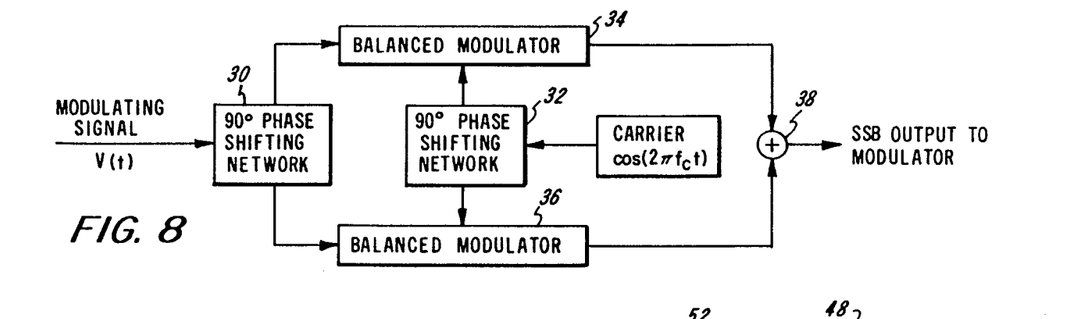
FIGS. 8 and 9 are schematic diagrams of circuits for modifying the drive signal supplied to the modulator of the scanner of FIG. 1.

In accordance with another embodiment of the invention, the loss of laser light is minimized by utilizing a single sideband signal as the modulator drive signal which conventionally is a double sideband drive signal. The light distribution at the deflector window is defined by the spectral frequency content of the modulator's drive signal. If light is scattered outside of the deflector mirror window, it is because the modulator's drive signal contains frequency components which fall outside of the "bandpass window", the electronic analogue of the deflector window. As shown in FIG. 8 these parasitic frequency components are eliminated by having the video signal and the modulated carrier signal supplied to 90 degree phase shifting networks 30 and 32, respectively. The dual outputs of the phase shifting networks 30 and 32 are supplied as dual inputs to conventional balanced modulators 34 and 36, the outputs of modulators 34 and 36 being added in summer 38 to provide the desired single sideband output signal which is supplied to modulator 8.

Figure 9:
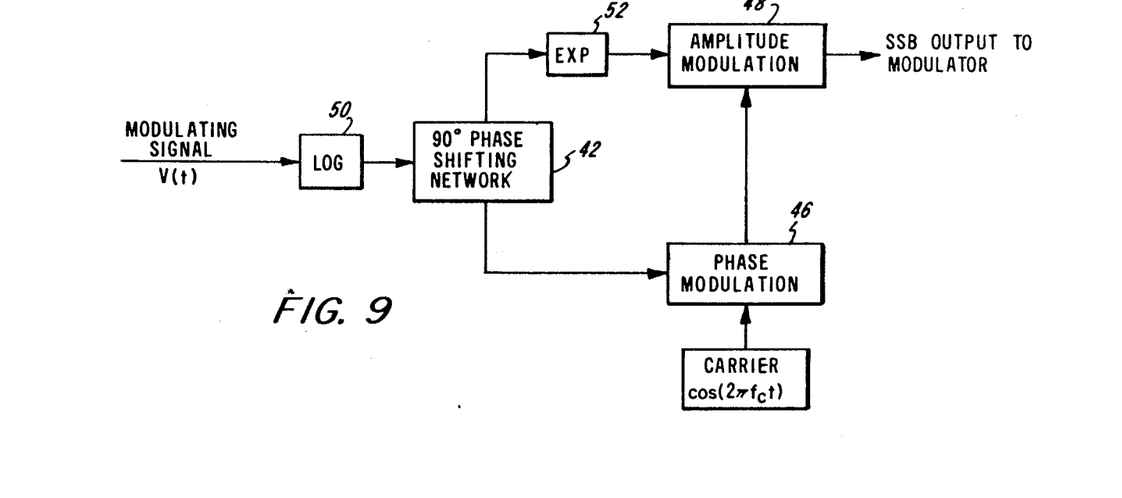

The distortion of the exposure profile and the degradation in exposure contrast ratio will remain, even with a single sideband drive signal supplied to modulator 8, as discussed supra, in reference to FIG. 8. The distortion of the exposure profile arises because a "phase quadrature" term is added to the desired video signal when eliminating one of the spectral sidebands. The desired signal is no longer encoded solely as amplitude modulation of the acoustic carrier, but now also includes a phase modulation. The drive circuit of FIG. 9 predistorts the modulator drive signal so that the ensuing phase quadrature component will induce the exposure profile to match precisely the desired profile. Referring to FIG. 9, the conventional double sideband modulator drive signal is supplied through a non-linear electronic network 50 with a logarithmic transfer function to a 90 degree phase shifting network 42 which has dual outputs to a non-linear electronic network 52 with a exponential transfer function and to a phase modulator 46. Also supplied to the phase modulator 46 is the carrier signal. The output of modulator 46 is supplied as an input to amplitude modulator 48 which also receives the output of network 52. The output of modulator 48 is the desired phase distorted single sideband drive signal that would be supplied to modulator 8. The circuit of FIG. 9, which is described in detail in an article by K. H. Powers, Proc. IRE 48 1431 (1960), is most effective for a bandlimited analog video signal. It is understood that a binary digital video signal (which is not bandlimited) would require a different drive signal.

Although the invention has been described utilizing a galvanometer mirror as the deflector window, other deflector windows, such as, for example, a multi-faceted polygon can be used instead of a galvanometer mirror, with each facet of the polygon sequentially acting as the deflector window.

I claim:
1. An optical scanner system having increased frequency response, comprising:
   means for generating a high intensity light beam,
   an optical modulator interposed in the path of said light beam,
   a double sideband video drive signal supplied to said optical modulator to produce a light intensity profile having ordered modes distributed about a point of maximum intensity,
   a photosensitive surface, and
   a moveable, light reflecting surface, said surface being positioned relative to said light profile so that said point of maximum intensity of said light intensity profile is displaced from the center of said light reflecting surface whereby ordered modes on one side of said point of maximum intensity of said light intensity profile are preferentially transmitted to said photosensitive surface whereby the frequency response of said system is increased.

2. An optical scanner system having increased frequency response, comprising:
   means for generating a high intensity light beam,
   an optical modulator interposed in the path of said light beam,
   a single sideband video drive signal supplied to said optical modulator to produce a light intensity profile having ordered modes distributed on one side of a point of maximum intensity,
   a photosensitive surface, and
   a moveable, light reflecting surface, said surface being positioned relative to said light profile so that said point of maximum intensity of said light intensity profile is displaced from the center of said light reflecting surface whereby the ordered modes on said one side of said point of maximum intensity of said light intensity profile are transmitted to said photosensitive surface whereby the frequency response of said system is increased.

3. An optical scanner system having increased frequency response due to transmission to a photosensitive surface of only a single sideband of a light profile, comprising,
   means for generating a high intensity light beam,
   an optical modulator interposed in the path of said light beam,
   a double sideband video drive signal for said optical modulator, said double sideband video drive signal causing the light profile emerging from the modulator to have a first video component and a second video component, each of said video components containing at least some of the same video information, and
   optical bandpass means so positioned in the path of said light profile for permitting substantially only one of said video components to reach said photosensitive surface whereby redundant video information is not passed to said photosensitive surface and the frequency response of the system is increased.

4. An optical scanner system having increased frequency response due to transmission to a photosensitive surface of only a single sideband of a light profile, comprising:
   means for generating a high intensity light beam,
   an optical modulator interposed in the path of said light beam,
   a single sideband video drive signal for said optical modulator, said video drive signal causing the light profile emerging from the modulator to have substantially only a single sideband, and
   optical bandpass means so positioned in the path of said light profile for permitting all of said single sideband to reach said photosensitive surface whereby the frequency response of the system is increased.

5. An optical scanner system having increased frequency response due to transmission to a photosensitive surface of a single sideband of a light profile, comprising:
   means for generating a high intensity light beam,
   an optical modulator interposed in the path of said light beam,
   first means for generating a single sideband video drive signal,
   second means coupled to said first means for phase distorting said single sideband video drive signal and for supplying said phase distorted single sideband video drive signal to said optical modulator, said video drive signal causing the light profile emerging from said modulator to have a single sideband, and
   a rotatable reflecting surface, said reflecting surface being positioned relative to said light profile so that all of said single sideband of said light profile falls on said reflecting surface whereby increased resolution can be achieved by the scanner system due to the increased bandwidth capabilities of said single sideband light profile.

* * * * *